Patented May 3, 1932

1,856,294

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

PROCESS FOR PRODUCING A FOAMY BODY ADAPTED TO BE USED IN MAKING CELLULAR CONCRETE

No Drawing. Application filed April 24, 1923. Serial No. 634,370.

The present invention relates to improvements in the process of making cellular concrete, such as has been described in my co-pending application, Serial No. 608,349. In the latter application a method was set forth for introducing gas bubbles, preferably produced by whipping a gelatinous substance in the presence of water, into a foam or lather. This foam, as described in said application, is mixed into the cement in a dry or a soft state and produces a cellular concrete which although possessing many of the working qualities of ordinary concrete is extremely light in weight and may even form a substitute in many cases for wood.

The present invention relates more particularly to the process for making the foam or lather, it having been found by successive experiments that by the introduction of various agents the quality of the foam may be improved so that the walls of the bubbles are strengthened and the foam is rendered less apt to dissolve or to break up while it is being mixed into the cement.

While in the co-pending specification a gelatinous mixture was considered as a suitable base for producing the foam, I have established by later experiments that any protein substance in colloidal solution will serve to make foam or lather for cellular concrete. The following forms of protein are especially suitable: Egg albumen; blood albumen; and casein.

I further discovered that foaming agents may be added to the solution with beneficial results. As the first one among these foaming agents I will mention rosin. The latter is dissolved in acetone or alcohol and then sufficient formalin added to cause the rosin to disperse in the form of a very fine precipitate when added to an aqueous liquid. This solution is poured into the gelatinous or other colloidal protein solution. The precipitate of rosin remains in suspension and when the solution is beaten to a froth becomes a part of the walls of the bubbles which constitute the froth. The presence of rosin, forming a constituent of the material of the walls of the bubbles, acts as a protector and strengthener after the bubbles have been formed and acts as a foaming agent before the bubbles have been formed, insofar as it lowers the surface tension of the liquid and adds to its viscosity.

While rosin was originally used for this purpose, further experiments showed that other resins, namely, copal, Bakelite varnish, and also such materials as celluloid and rubber may be used instead of rosin. For the foaming agent the following formulas may be used:

Rosin, 20 grams; acetone, 50 cubic centimeters; formalin, 34¼ cubic centimeters; or if alcohol is used as a dissolving agent: rosin, 100 grams; alcohol, 335 cubic centimeters; formalin, 181 cubic centimeters.

In making up either of these solutions or other similar solutions of celuloid or rubber, the proportions of acetone and formalin or of alcohol or other solvent and formalin must be carefully balanced, both to each other and to the amount of resinous substance used. The compound should be mixed in the following manner: The resinous substance should be dissolved in the solvent and the formalin should be added in small portions, portion by portion, shaking the container in the meantime, until the solution becomes slightly cloudy. Then the solution may be tested by dropping a drop or two into a vessel of clear water. If the solution emulsifies at once and spreads all through the water, forming a milky dispersed precipitate or colloidal solution, the proportion of the resinous substance to the solvent and to the formalin is correct. But if the precipitate is not fine enough to remain in suspension, more formalin or more solvent should be added drop by drop, repeating the test given above at intervals. It will be found that a condition of maximum diffusibility will be attained so that the precipitate diffuses throughout the water without clotting.

In using the above described foaming agent the following proportions may be used in making a lather suitable for making cellular cement:

Gelatin or glue, 0.15 percent more or less; foaming agent, 0.10 percent; water, 99.75 percent.

These proportions may be varied within wide limits, it being desirable, however, to make the proportion of all ingredients as low as is consistent with proper foaming of the solution so as not to interfere with the setting of the cellular cement or concrete.

While the resinous substance thus far described after being dissolved in alcohol or acetone in the presence of a dispersing agent such as formalin is considered by me as a foaming agent particularly suited for the process, I wish to state that I have obtained satisfactory results with other foaming agents, among which may be mentioned the following:

Glycerol added to the foam solution is beneficial to the latter. The following formulas may be used:

| | |
|---|---|
| Water | 98.5 percent |
| Gelatin | 1.0 percent |
| Glycerol | 0.5 percent | or:

| | |
|---|---|
| Water | 98.3 percent |
| Gelatin | 1.0 percent |
| Formalin | 0.2 percent |
| Glycerol | 0.5 percent |

Further successful experiments were made by the use of Spanish bark, usually known as soap bark, which is a well-known glucoside. The glucoside was steeped into 99 parts of water to one part of soap bark for twenty minutes. The resulting liquor was easily beaten into a stiff froth which mixed very successfully with cement or plaster. Other glucosides and saponins were tried later with success, namely: yucca, of several varieties, the amole plant,—a local soap root which in appearance resembles an onion,—and the roots of the senega plant. Solutions from these various glucosides were used alone and also mixed with a gelatinous solution, causing the same to foam more efficiently.

As a further foaming agent phenol may be mentioned, which when added to a solution of gelatin tends to stiffen the froth and also seems to prevent the bubbles from breaking when mixed with strong alkaline cements. Phenol also is a good preservative for the gelatin solution. I used various phenol derivatives, among them Lysol, with excellent results.

I noted that the effect of phenol or a phenol derivative upon the subsequent setting of Portland cement is quite marked and very beneficial, counteracting the tendency of the glue solution to delay the setting of the cement. The following formula might be used in this connection:

| | |
|---|---|
| Gelatin | 0.25 percent |
| Phenol | 0.12 percent |
| Formalin | 0.12 percent |
| 1% solution of glucoside | 0.25 percent |
| Water | 99.25 percent |

I further discovered that the vapor of chloroform gives the foam a marked stability such that it becomes more insoluble in water or in the cement mixture. The chloroform is sprayed into the chamber of the beater before the solution is beaten into a froth, that is to say, the lather is made in an atmosphere of chloroform vapor.

I found that a foam made in this manner could be washed with water previously to using the same in making cellular cement, whereby any excess of soluble gelatin is removed. The action of the chloroform vapor seems to harden the walls of the bubbles by toughening the films so that they do not easily break or go into solution in alkaline cements.

It should be mentioned that different methods may be used for mixing gas into a solution for the purpose of producing foam or lather. Air may, for instance, be introduced under pressure, in the bottom of a tank holding the solution, and strained through a suitable filter.

I claim:

1. The process of producing a lather for making a permanent foam which comprises dispersing a resinous substance in alcohol, adding the resultant dispersion to a foam stabilizing solution and mixing the solution with an inert gas to produce a lather.

2. The process of producing a lather for making a permanent foam which comprises adding a dispersing agent to a resinous substance, adding the resultant dispersion to a solution whereby the resinous substance is precipitated, and mixing the solution with an inert gas to produce a lather.

3. The process of producing a lather for making a permanent foam which comprises the dispersing of a resinous substance in the presence of formalin, adding the resultant dispersion to a solution whereby the resinous substance is precipitated and the mixing of the solution with an inert gas to produce a lather.

4. The process of producing a lather for forming a permanent foam which comprises dispersing a resinous substance in alcohol in the presence of formalin, adding the resultant dispersion to a solution, and mixing the solution with an inert gas to produce a lather.

5. The process of producing a lather for forming a permanent foam which comprises adding a foaming agent to a solution, and mixing the solution with an inert gas in the presence of chloroform vapor to produce a lather.

6. A composition of matter comprising a resinous substance, a solvent therefor and formalin in the form of a foam.

7. A composition of matter comprising rosin in suspension and formalin in the form of a foam.

8. The process of producing a lather for forming a permanent foam which comprises the steps of dispersing a resinous substance, adding the resultant dispersion to a solution, whereby some of the said resinous substance is precipitated in the foam producing solution, and treating the resultant mixture with a gas to produce a lather whereby the resinous substance is dispersed throughout the cellular walls of the lather and serves to reinforce said walls.

JOHN A. RICE.